(12) United States Patent
Teng et al.

(10) Patent No.: US 8,978,848 B2
(45) Date of Patent: Mar. 17, 2015

(54) APPARATUS FOR MODULARLY ADJUSTING SHOCK ABSORBER

(75) Inventors: Chin-Kun Teng, Taichung (TW); Yan-Ting Wu, Chiayi (TW)

(73) Assignee: Durashox Technology Co., Ltd., Taichung (TW)

(*) Notice: Subject to any disclaimer, the term of this patent is extended or adjusted under 35 U.S.C. 154(b) by 1065 days.

(21) Appl. No.: 12/779,895

(22) Filed: May 13, 2010

(65) Prior Publication Data

US 2011/0278118 A1 Nov. 17, 2011

(51) Int. Cl.
*F16F 9/54* (2006.01)
*F16F 9/342* (2006.01)
*F16F 9/46* (2006.01)

(52) U.S. Cl.
CPC ............... *F16F 9/342* (2013.01); *F16F 9/461* (2013.01); *F16F 2230/32* (2013.01)
USPC .............. 188/322.2; 188/266; 188/299.1; 188/282.4

(58) Field of Classification Search
USPC .............. 188/266, 299.1, 282.1–282.9, 278, 188/319.2
See application file for complete search history.

(56) References Cited

U.S. PATENT DOCUMENTS

| | | | |
|---|---|---|---|
| 1,530,861 A * | 3/1925 | Standen | 70/298 |
| 3,021,924 A * | 2/1962 | Patterson, III et al. | 188/82.7 |
| 4,043,435 A * | 8/1977 | DeKock et al. | 188/319.2 |
| 4,592,540 A | 6/1986 | Yokoya et al. | |
| 4,647,069 A | 3/1987 | Iijima | |
| 4,729,459 A | 3/1988 | Inagaki et al. | |
| 4,799,371 A * | 1/1989 | Duncan | 70/214 |
| 4,948,163 A | 8/1990 | Kikushima et al. | |
| 5,018,405 A * | 5/1991 | Chiu | 74/529 |
| 5,094,325 A * | 3/1992 | Smith | 188/282.1 |
| 5,301,570 A * | 4/1994 | Li | 74/551.1 |
| 5,347,883 A * | 9/1994 | Thony | 74/551.3 |
| 5,957,252 A | 9/1999 | Berthold | |
| 6,119,829 A | 9/2000 | Nakadate | |
| 6,120,049 A | 9/2000 | Gonzalez et al. | |
| 6,286,641 B1 | 9/2001 | De Frenne | |
| 6,360,857 B1 | 3/2002 | Fox et al. | |
| 6,427,986 B1 | 8/2002 | Sakai et al. | |
| 6,659,239 B2 | 12/2003 | Van Wonderen et al. | |
| 6,722,171 B1 * | 4/2004 | Ruan | 70/379 R |
| 6,767,024 B1 * | 7/2004 | Kuo | 280/276 |
| 7,270,222 B1 * | 9/2007 | Aymar | 188/285 |
| 8,235,187 B2 * | 8/2012 | Murakami | 188/285 |
| 2003/0111310 A1 * | 6/2003 | Renton et al. | 188/374 |

* cited by examiner

*Primary Examiner* — Robert A Siconolfi
*Assistant Examiner* — James Hsiao
(74) *Attorney, Agent, or Firm* — CKC & Partners Co., Ltd.

(57) ABSTRACT

An apparatus for modularly adjusting a shock absorber includes a base, a plurality of pins, and a selecting mechanism. The pins are connected to the base. The selecting mechanism can select at least one of the pins to control at least one valve of the shock absorber.

10 Claims, 4 Drawing Sheets

APPARATUS FOR MODULARLY ADJUSTING SHOCK ABSORBER

BACKGROUND

1. Technical Field

The present disclosure relates to suspension systems. More particularly, the present disclosure relates to shock absorbers.

2. Description of Related Art

A suspension system is a mechanical device that connects a vehicle to its wheels. Suspension systems serve a dual purpose—keep all wheels on the road in spite of hard cornering, swerving and bumps in the road, and keeping vehicle occupants comfortable and reasonably well isolated from road noise, bumps, and vibrations. These goals are at odds, so the tuning of suspension systems involves finding the right compromise.

SUMMARY

According to one embodiment of the present invention, an apparatus for modularly adjusting a shock absorber includes a base, a plurality of pins, and a selecting mechanism. The pins are connected to the base. The selecting mechanism can select at least one of the pins to control at least one valve of the shock absorber.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
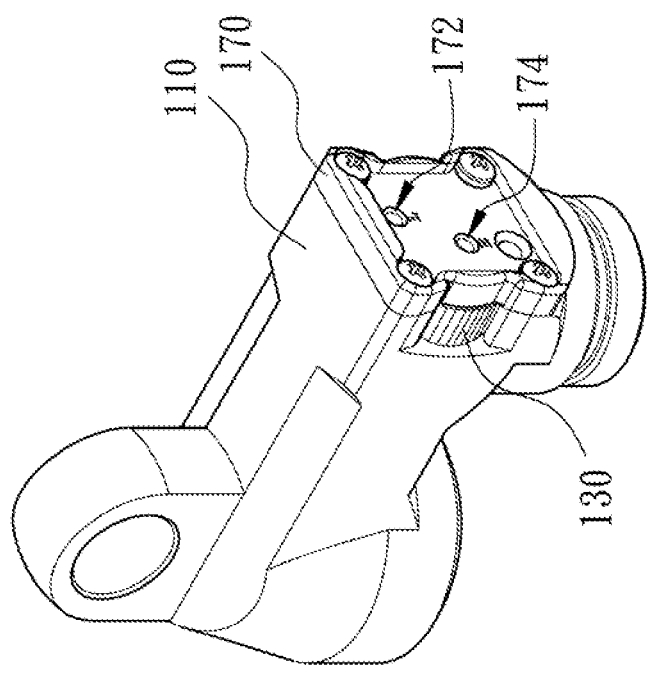
FIG. 1 is a three dimensional view of a suspension system according to one embodiment of the present invention.
Figure 2:
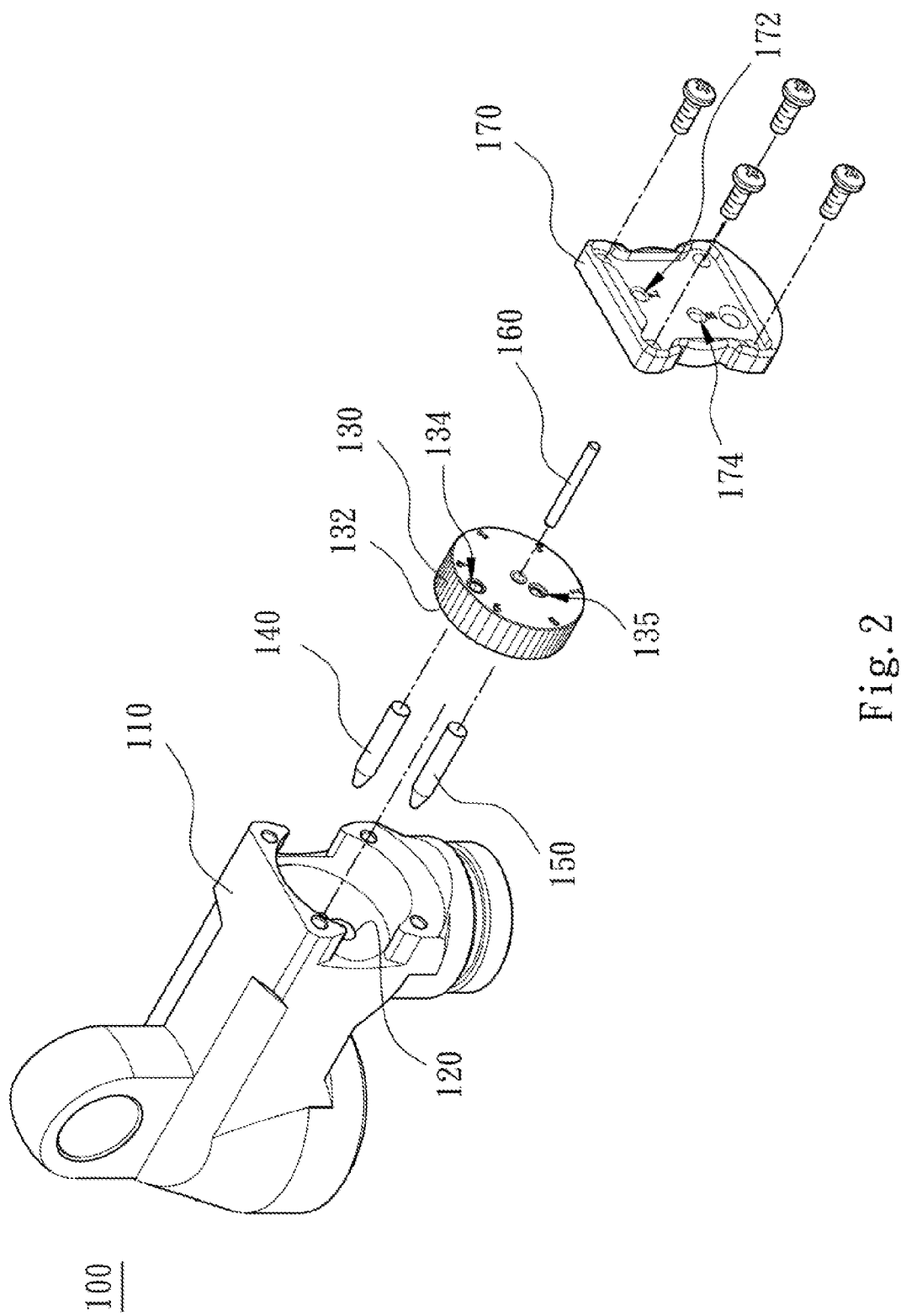
FIG. 2 is an exploded view of the suspension system of FIG. 1, showing that each pin group has one pin.

FIG. 1 is a three dimensional view of a suspension system 100 according to one embodiment of the present invention. FIG. 2 is an exploded view of the suspension system 100 of FIG. 1, showing that each pin group has one pin. As shown in FIGS. 1 and 2, the suspension system 100 includes a shock absorber 110, at least one valve 120, a base 130, a plurality of pins (separated into a first pin group 140 and a second pin group 150), and a selecting mechanism 160. The pins (including the first pin group 140 and the second pin group 150) are connected to the base 130. The selecting mechanism 160 can select one of the first pin group 140 and the second pin group 150 to control the valve 120 to change the stiffness of the shock absorber 110.

In the present embodiment, each of the first pin group 140 and the second pin group 150 includes one pin. It is appreciated that the numbers of the pins in the first pin group 140 and the second pin group 150 may vary within the scope of the invention.

Figure 3:
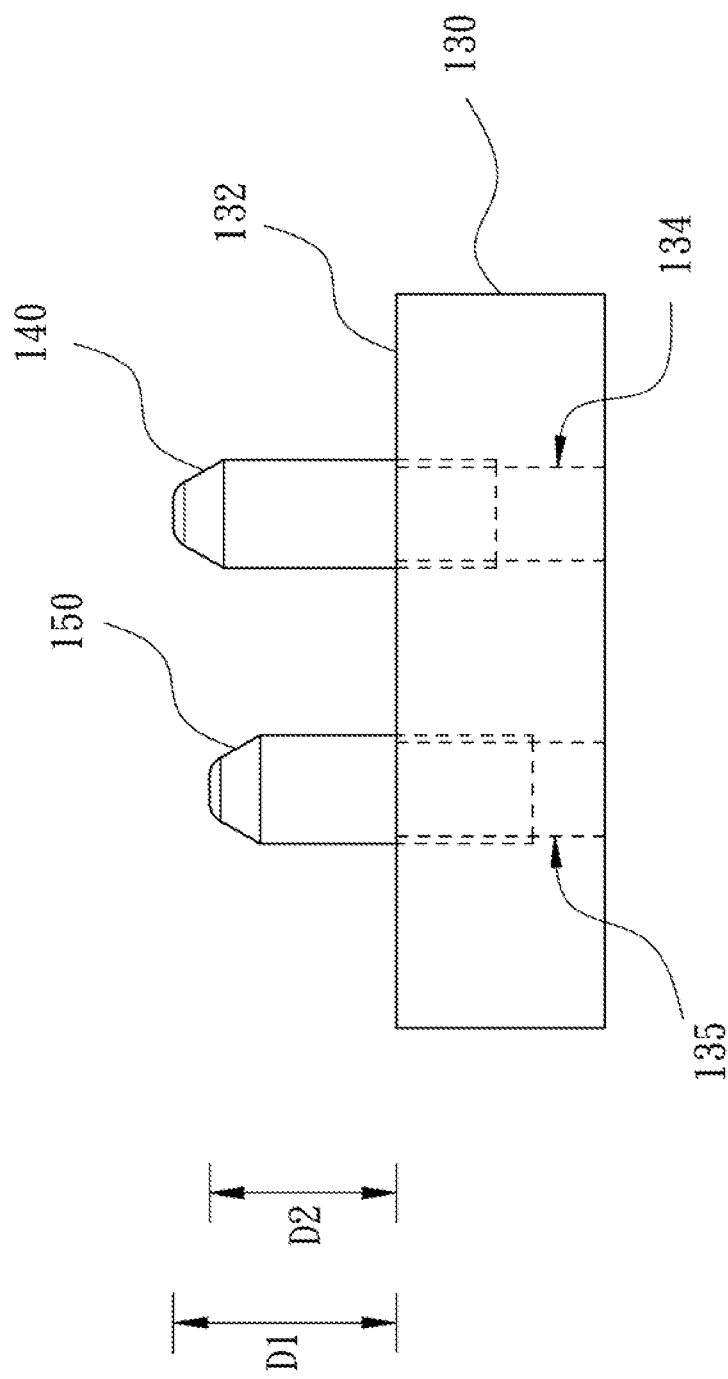
FIG. 3 is a front view of the base of FIG. 2.

FIG. 3 is a front view of the base 130 of FIG. 2. The base 130 has a surface 132 opposite the valve 120, i.e. the shock absorber 110. The pin in the first pin group 140 protrudes a first distance D1 from the surface 132 of the base 130. The pin in the second pin group 150 protrudes a second distance D2 from the surface 132 of the base 130. The first distance D1 is different from the second distance D2.

In use, the user may select the first pin group 140 or the second pin group 150 to push the valve 120, such that the valve 120 will change the stiffness of the shock absorber 110. For example, the user may select the first pin group 140 to push the valve 120 when the user wants to keep the vehicle occupants comfortable. On the other hand, the user may select the second pin group 150 to push the valve 120 when the user wants to give a better road feel to the driver.

Return to FIG. 2. The base 130 has at least one first threaded through hole 134 and at least one second threaded through hole 135 therein. The pins (including the first pin group 140 and the second pin group 150) are threaded into the first threaded through hole 134 and the second threaded through hole 135 respectively. A cover 170 covering the base 130 may have a plurality of through holes 172/174 exposing the first threaded through hole 134 and the second threaded through hole 135 respectively. In use, the user may use a hand tool to turn the pins (including the first pin group 140 and the second pin group 150) to tune the valve 120 of the shock absorber 110.

The selecting mechanism 160 of FIG. 2 includes an axle. The axle 160 allows the base 130 to rotate around the axle 160, such that one of the first pin group 140 and the second pin group 150 will be moved to push the valve 120. In use, the user may turn the base 130 to adjust the valve 120 by his/her hand. In another embodiment, the base 130 can be motorized. In this embodiment, the driver can remotely adjust the valve 120 in the driver's seat. Alternatively, the valve 120 may be controlled dynamically via a computer in response to sensors, giving both a smooth ride and a firm suspension when needed.

Figure 4:
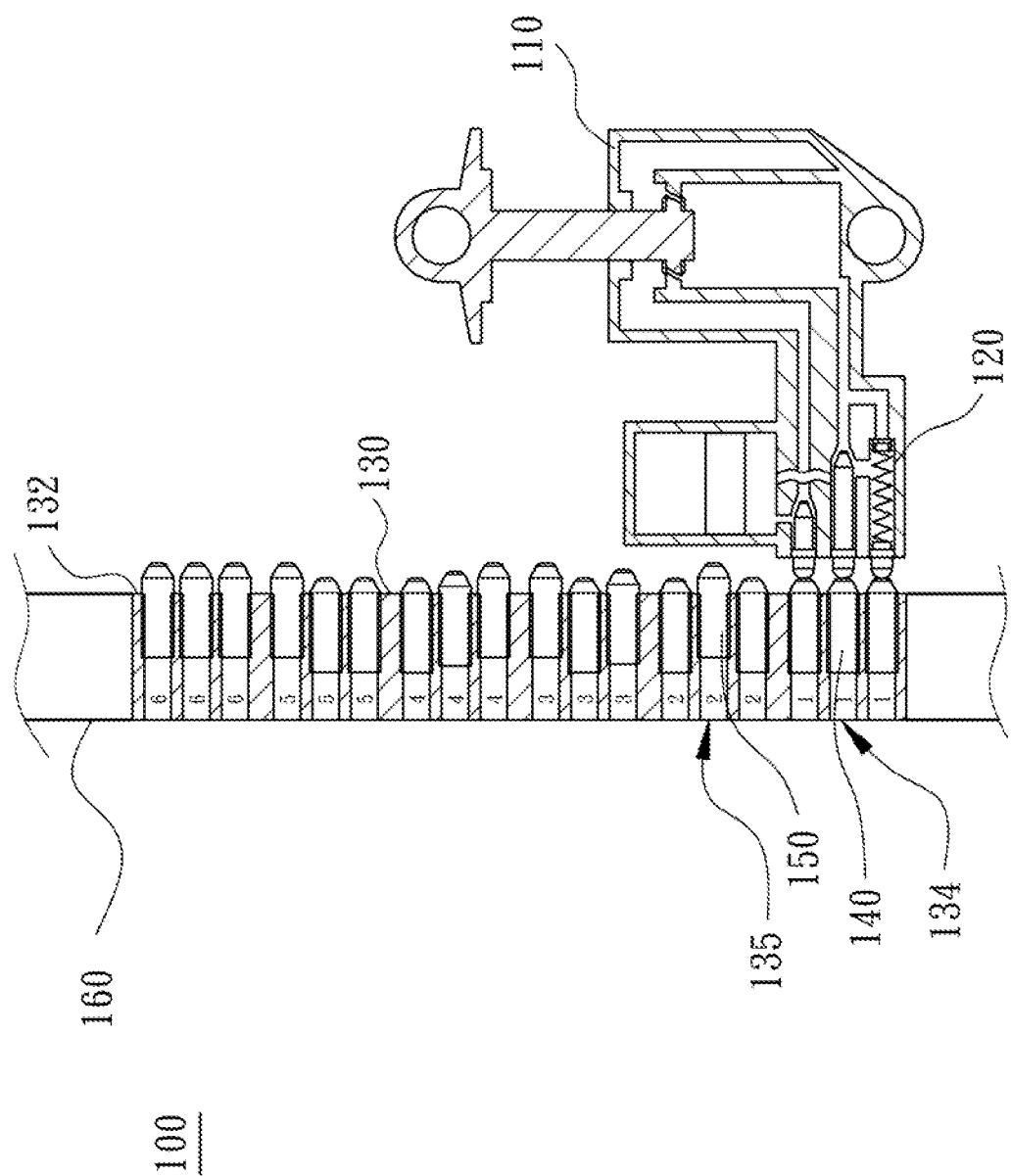
FIG. 4 is a schematic view of a suspension system according to another embodiment of the present invention, showing that each pin group has three pins.

It is appreciated that many other devices may be used as the selecting mechanism 160, for instance, a linear moving mechanism may be substituted for the axle as the selecting mechanism 160 (as shown in FIG. 4). In FIG. 4, the linear moving mechanism 160 may be a linear slide system. Similarly, the linear slide system can be motorized or manual.

FIG. 4 is a schematic view of a suspension system 100 according to another embodiment of the present invention, showing that each pin group has three pins. In FIG. 4, a plurality of valves 120, e.g. three valves 120, are employed to change the stiffness of the shock absorber 110. In this embodiment, each pin group 140/150 has at least two pins, e.g. three pins, to adjust the valves 120. The pins in the first pin group 140 may protrude same distances from the surface 132 of the base 130, but the pins in the second pin group 150 may protrude different distances from the surface 132 of the base 130. The first pin group 140 and the second pin group 150 represent different stiffness modes. In this embodiment, there are six stiffness modes provided in the suspension system 100, that is, the suspension system 100 has six pin groups, e.g. the first pin group 140 and the second pin group 150, to adjust the valves 120. In use, the user can select one of the stiffness modes for the suspension system 100 in response to the vehicle occupants feel.

All the features disclosed in this specification (including any accompanying claims, abstract, and drawings) may be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. §112, 6th paragraph. In particular, the use of "step of" in the claims is not is intended to invoke the provisions of 35 U.S.C. §112, 6th paragraph.

What is claimed is:

1. An apparatus for modularly changing a stiffness of a shock absorber, the apparatus comprising:
   a base comprises a surface facing the shock absorber;
   a plurality of pins connected to the base, wherein the pins are separated into at least two pin groups, each of the pin groups comprises at least two of the pins, and the pins of each pin group protrude different distances from the surface of the base; and
   a selecting mechanism turned for moving one of the pin groups to push at least one valve of the shock absorber.

2. The apparatus of claim 1, wherein the pins are separated into at least six pin groups, and the selecting mechanism is for moving one of the pin groups to push the valve of the shock absorber.

3. The apparatus of claim 2, wherein the pin groups each comprises at least three of the pins.

4. The apparatus of claim 1, wherein the base comprises a plurality of threaded through holes therein, and the pins are threaded into the threaded through holes of the base respectively.

5. The apparatus of claim 4, further comprising:
   a cover covering the base, the cover comprising a plurality of through holes exposing the threaded through holes of the base respectively.

6. The apparatus of claim 1, wherein the selecting mechanism comprises:
   an axle for allowing the base to rotate around the axle, such that at least one of the pins will be moved to push the valve of the shock absorber.

7. The apparatus of claim 1, wherein the selecting mechanism comprises:
   a linear moving mechanism for allowing the base to move linearly, such that at least one of the pins will be moved to push the valve of the shock absorber.

8. A suspension system comprising:
   a shock absorber comprising at least one valve, wherein a degree of depression of the valve varies a stiffness of the shock absorber; and
   an apparatus for changing the stiffness of the shock absorber, the apparatus comprising:
      a base comprising an axle hole, a plurality of through holes angularly spaced apart from the axle hole, and a surface facing the shock absorber;
      a plurality of pins engaged respectively with the through holes of the base and protruding from the surface of the base by distances that are different from each other;
      an axle received in the axle hole in the base, wherein the base is rotatable about the axle; and
      a cover coupled to the shock absorber with the base interposed between the shock absorber and the cover;
   wherein a rotation of the base about the axle selectively engages the pins with the valve of the shock absorber one at a time to push the valve, and each pin pushes the valve when engaged therewith by an amount that is different from an amount that any other pin pushes the valve of the shock absorber, such that each pin is associated with a unique stiffness of the shock absorber.

9. The suspension system of claim 8, wherein:
   the through holes of the base are threaded;
   the pins are threaded adjustably and respectively to the through holes of the base; and
   the cover is formed with a plurality of through holes that are aligned with and expose the through holes of the base;
   wherein degrees of threading of the pins respectively to the through holes of the base determines the distances by which the pins protrude from the surface of the base.

10. The suspension system of claim 8, wherein the base is manually rotated about the axle by a user, remotely rotated about the axle by the user, or controlled by a computer in response to sensors to rotate about the axle.

* * * * *